United States Patent
Dalsgaard et al.

(10) Patent No.: US 10,327,275 B2
(45) Date of Patent: Jun. 18, 2019

(54) NETWORK CONTROLLED AND DEPLOYMENT BASED INCREASED PRIMARY CELL MEASUREMENTS

(71) Applicant: Nokia Technologies Oy, Espoo (FI)

(72) Inventors: Lars Dalsgaard, Oulu (FI); Petteri Lunden, Espoo (FI); Elena Virtej, Espoo (FI); Jorma Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/518,461

(22) PCT Filed: Oct. 15, 2015

(86) PCT No.: PCT/US2015/055789
§ 371 (c)(1),
(2) Date: Apr. 11, 2017

(87) PCT Pub. No.: WO2016/064654
PCT Pub. Date: Apr. 28, 2016

(65) Prior Publication Data
US 2017/0311370 A1    Oct. 26, 2017

Related U.S. Application Data

(60) Provisional application No. 62/068,381, filed on Oct. 24, 2014.

(51) Int. Cl.
*H04L 5/00* (2006.01)
*H04W 24/08* (2009.01)
(Continued)

(52) U.S. Cl.
CPC .......... *H04W 76/15* (2018.02); *H04W 24/10* (2013.01); *H04W 36/0094* (2013.01);
(Continued)

(58) Field of Classification Search
CPC . H04W 76/15; H04W 76/28; H04W 52/0216; H04W 36/0094; H04L 5/0098
See application file for complete search history.

(56) References Cited

U.S. PATENT DOCUMENTS 8,538,423 B2    9/2013   Huang et al.
8,913,518 B2 *  12/2014  Heo ............... H04W 52/54
                                              370/252
(Continued)

FOREIGN PATENT DOCUMENTS

EP    2706785 A1    3/2014
GB    2489770 A     10/2012
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 12)", 3GPP TS 36.300, V12.3.0, Sep. 2014, pp. 1-215.
(Continued)

*Primary Examiner* — Mohammad S Anwar
(74) *Attorney, Agent, or Firm* — Squire Patton Boggs (US) LLP (57) ABSTRACT

Communication systems may benefit from appropriate measurements of transmitters. For example, certain communication systems using dual connectivity may benefit from network controlled and deployment based increased primary cell measurements. A method can include configuring, by a network element, a user equipment to perform measurements on both a master cell group and a secondary cell group, according to activity in the secondary cell group.

20 Claims, 4 Drawing Sheets

(51) Int. Cl.
　　*H04W 24/10*　　(2009.01)
　　*H04W 36/00*　　(2009.01)
　　*H04W 52/02*　　(2009.01)
　　*H04W 76/10*　　(2018.01)
　　*H04W 76/15*　　(2018.01)
　　*H04W 76/28*　　(2018.01)

(52) U.S. Cl.
　　CPC ....... *H04W 52/0216* (2013.01); *H04W 76/28* (2018.02); *H04L 5/0098* (2013.01); *H04W 24/08* (2013.01); *H04W 36/0085* (2018.08); *H04W 52/0212* (2013.01); *H04W 76/10* (2018.02); *Y02D 70/1262* (2018.01); *Y02D 70/20* (2018.01); *Y02D 70/24* (2018.01)

(56) References Cited

U.S. PATENT DOCUMENTS

| | | | | |
|---|---|---|---|---|
| 9,356,744 | B2* | 5/2016 | Yu | H04W 76/36 |
| 9,713,024 | B2* | 7/2017 | Liang | H04W 24/10 |
| 2012/0252432 | A1 | 10/2012 | Henttonen | |
| 2013/0114568 | A1* | 5/2013 | Sagae | H04W 36/30 |
| | | | | 370/332 |
| 2014/0029514 | A1 | 1/2014 | Yu et al. | |
| 2014/0078973 | A1* | 3/2014 | Kazmi | H04W 8/22 |
| | | | | 370/329 |
| 2014/0192740 | A1 | 7/2014 | Ekpenyong et al. | |
| 2014/0335882 | A1 | 11/2014 | Lee et al. | |

FOREIGN PATENT DOCUMENTS

| | | | |
|---|---|---|---|
| WO | 2014/025302 | A1 | 2/2014 |
| WO | 2014/142512 | A1 | 9/2014 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.3.0, Sep. 2014, pp. 1-378.

"3rd Generation Partnership Project;Technical Specification Group Radio Access Network; Evolved Universal Terrestrial Radio Access (E-UTRA);Requirements for support of radio resource management(Release 12)", 3GPP TS 36.133, V12.5.0, Sep. 2014, pp. 1-877.

International Search Report and Written Opinion received for corresponding Patent Cooperation Treaty Application No. PCT/US2015/055789, dated Jan. 8, 2016, 8 pages.

Extended European Search Report received for corresponding European Patent Application No. 15853168.1, dated May 7, 2018, 11 pages.

"UE Behaviours in DRX for SCC Measurements with Deactivated Scell", 3GPP TSG-RAN Working Group 4 meeting #59AH, R4-113537, Agenda: 5.7.1, NTT DOCOMO, Jun. 27-Jul. 1, 2011, 3 pages.

"Analysis of Activation/Deactivation of Secondary Cell", 3GPP TSG-RAN Working Group 4 meeting #56, R4-103210, Agenda: 8.3.1.3, Ericsson, Aug. 23-27, 2010, 3 pages.

"Consideration on Deactivated SCC Measurement Core Requirements in CA", 3GPP TSG-RAN Working Group 4 meeting Ad Hoc 2010 #4, R4-103614, Agenda: 4.1.1.5, Huawei, Oct. 11-15, 2010, pp. 1-3.

"DRX Impact by Dual Connectivity", 3GPP TSG-RAN2 meeting #83, R2-13xxxx, Agenda: 7.2.1, LG Electronics Inc, Aug. 19-23, 2013, 2 pages.

European Office Action corresponding to Application No. 15 853 168.1, dated Jan. 22, 2019.

\* cited by examiner

NETWORK CONTROLLED AND DEPLOYMENT BASED INCREASED PRIMARY CELL MEASUREMENTS

RELATED APPLICATION

This application was originally filed as Patent Cooperation Treaty Application No. PCT/US2015/055789 filed Oct. 15, 2015 which claims priority benefit to U.S. Provisional Patent Application No. 62/068,381 filed Oct. 24, 2014.

BACKGROUND

Field

Communication systems may benefit from appropriate measurements of transmitters. For example, certain communication systems using dual connectivity may benefit from network controlled and deployment based increased primary cell measurements.

Description of the Related Art

Dual connectivity is currently being standardized in the third generation partnership project (3GPP). Dual connectivity (DC) can be applied by a user equipment (UE) that has at least 2 downlink (DL) and 2 uplink (UL) capability. When defining DC there may be a need to go through the UE requirements concerning measurement and monitoring rules. Additionally it may be important to analyze DC from a mobility point of view in order to determine whether there is a possible need for improving the existing behavior or whether DC can be used to enhance certain procedures.

In accordance with 3GPP specifications, the UE can be configured, for example by RRC/MAC, with a DRX functionality that allows the UE to stop monitoring PDCCH during some period of time. The DRX functionality can include a Long DRX cycle, a DRX Inactivity Timer, a DRX Retransmission Timer and optionally a Short DRX Cycle and a DRX Short Cycle Timer. When a DRX cycle has been configured, the UE can perform the following for each TTI: whenever a new DRX Cycle begins, the On Duration Timer is started. If a DL assignment has been configured for this TTI, the UE can start the HARQ RTT Timer. If the On Duration Timer or DRX Inactivity Timer or DRX Retransmission Timer is running; or if an UL grant for a retransmission can occur: the UE conventionally shall monitor the PDCCH; if the PDCCH is successfully decoded: if the PDCCH indicates a DL transmission: conventionally the HARQ RTT Timer can be started. If On Duration Timer or DRX Inactivity Timer is running and the PDCCH indicates a new transmission: the DRX Inactivity Timer can be started or restarted. If the DRX Inactivity Timer expires in this TTI: DRX Short Cycle Timer can be started if configured; moreover the short DRX cycle can be used if configured, otherwise the long DRX cycle can be used. If DRX Short Cycle Timer or the On Duration Timer expires in this TTI: the device can use the long DRX cycle. If HARQ RTT Timer expires in this TTI: conventionally the UE shall start or restart the DRX Retransmission Timer. Whether or not the UE is monitoring PDCCH, the UE can receive and transmit HARQ feedback when expected. To date these operations are configured for example using control data and/or based on a device load, or traffic type or traffic profile.

For DC the DRX may be configured independently on a primary cell (PCell) and a primary secondary cell (PSCell), for example for master cell group (MCG) and secondary cell group (SCG). The PSCell may be the cell in the secondary eNode B (SeNB) that carries physical uplink control channel (PUCCH). This approach may possibly provide for good UE power savings when, for example, the network can configure the UE to have long DRX on one cell group (CG) for the cases when the data activity on one component carrier (CC) is rather low or non-existing. At the same time, this approach may ensure that data transmission can continue smoothly on the CG that is used for scheduling. This may enable balance between data throughput and UE power savings.

Such use case could be, for example, the case where the DC is used for offloading purposes and one CG, such as the PSCell, is the cell used for offloading (e.g. data) traffic (for example massive data volumes) while the other CG, such as the PCell, is used to ensure robust connection to the network.

As the DRX length is extended towards longer DRX cycles in the PCell there will be an increased delay in the PCell measurements. The actual approach of how to define the measurements and measurement accuracy for DC is not standardized. There are several possible options.

One issue is intra-frequency measurements and their accuracy. For example, intra-frequency measurement requirements of PCell can be based on DRX state in MCG, while intra-frequency measurement requirements of PSCell can be based on DRX state in SCG.

In DC the mobility is based on PCell, namely MCG. There may be different deployment scenarios for DC depending on future use cases. In some deployments it would not cause any problems to have extended/long DRX on PCell/MCG while in other use cases it could cause harm to the mobility robustness on the PCell, for example when PSCell is placed at cell edge of the PCell.

In certain possible approaches, the UE would always be mandated to have increased measurements on PCell when PSCell is in non-DRX. In such an approach there is a lack of support for different deployment scenarios and a lack of flexibility.

In another approach, the network can continuously use rather short DRX in PCell. This may have a larger impact on UE power consumption and may reduce the user experience.

For measurements within E-UTRAN, two basic UE measurement quantities may be supported: Reference symbol received power (RSRP) and Reference symbol received quality (RSRQ), as stated in '3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2' 3GPP TS 36.300 V12.3.0. For example, PCell measurements may be RRM measurement of PCell that would normally be reported by the UE in a MeasurementReport. The MeasurementReport message is used for the indication of measurement results, as indicated in '3rd Generation Partnership Project; Technical Specification Group Radio Access Network; Evolved Universal Terrestrial Radio Access (E-UTRA); Radio Resource Control (RRC); Protocol specification 3GPP TS 36.331 V12.3.0' and '3rd Generation Partnership Project; Technical Specification Group Radio Access Network; Evolved Universal Terrestrial Radio Access (E-UTRA); Requirements for support of radio resource management 3GPP TS 36.133 V12.5.0'.

In addition to or instead of RSRP and RSRQ measurements, PCell measurements may comprise for example detection of cells, identification of detected cells, received signal power measurements such as RSSI, radio link monitoring (monitoring for possible radio link failure). Besides RRM measurements, also channel state measurements such as CSI and CQI measurements may be considered PCell measurements as discussed herein.

SUMMARY

According to a first embodiment, a method can include configuring, by a network element, a user equipment to perform measurements on both a master cell group and a secondary cell group, according to activity in the secondary cell group.

In variant, the configuring can include requiring the user equipment to perform increased measurements on a primary cell according to at least one of normal intra-frequency measurements when a primary secondary cell is in non-discontinuous reception or an active timer is running in the secondary cell group or the user equipment has a pending scheduling request in the secondary cell group.

According to a second embodiment, a method can include configuring a user equipment, responsive to instructions from a network element, to perform measurements on both a master cell group and a secondary cell group, according to activity in the secondary cell group.

In a variant, when the user equipment is not yet or no longer configured with increased master cell group measurement based on secondary cell group activity, the user equipment can be configured to perform master cell group measurements according to a discontinuous reception of the master cell group.

In a variant, increased master cell group measurements can be extended to continue for a limited time after secondary cell group scheduling has stopped.

According to third and fourth embodiments, an apparatus can include means for performing the methods according to the first and second embodiments.

According to fifth and sixth embodiments, an apparatus can include at least one processor and at least one memory including computer program code. The at least one memory and the computer program code can be configured to, with the at least one processor, cause the apparatus to perform the methods according to the first and second embodiments.

According to seventh and eighth embodiments, a non-transitory computer-readable medium can be encoded with instructions that, when executed in hardware, perform a process. The process can be or include the methods according to the first and second embodiments.

According to ninth and tenth embodiments, a computer-program product can encode instructions for performing a process. The process can be or include the methods according to the first and second embodiments.

According to other embodiments, a system can include at least one apparatus of the third or fifth embodiments operationally connected to at least one apparatus of the fourth or sixth embodiments.

BRIEF DESCRIPTION OF THE DRAWINGS

For proper understanding of the invention, reference should be made to the accompanying drawings, wherein.

DETAILED DESCRIPTION

Certain embodiments provide a way to ensure user equipment (UE) mobility without sacrificing UE power consumption. More particularly, certain embodiments provide a method that enables use of long DRX on PCell with increased PCell measurements when PSCell is active, without making this a mandatory behavior in the UE, thereby avoiding negative impact on UE power savings in those cases where the behavior is not needed. For example, certain embodiments can optimize the DRX operation dynamically based at least on communication needs of the devices.

Thus, in certain embodiments, a network control method can enable the network to configure the UE such that the UE performs measurements also on MCG according to the activity in SCG. In other words, activity on the SCG can trigger measurements on both the MCG and the SCG. In some example embodiments this configuration may mean that the UE's activity in either MCG or SCG can trigger measurements on MCG.

The configuration can ensure that the UE enables increased measurements on the PCell, for example, according to normal intra-frequency measurements when the PSCell is in non-DRX or active timer is running in SCG or when, for example, UE has a pending scheduling request (SR) in SCG/PSCell.

When the UE is not configured with increased PCell/MCG measurement based on SCG/PSCell activity, the UE can perform MCG/PCell measurements according to the MCG/PCell DRX.

In some example embodiments, the UE can be configured to perform MCG/PCell measurements according to both MCG/PCell DRX and SCG/PSCell activity (or DRX). This could work, for example, so that the UE applies the requirement that is stricter, if MCG/PCell DRX and SCG/PSCell activity (or DRX) based requirements differ. Here, stricter can refer to involving more frequent measurements or having a stricter time requirement for performing some measurement action such as identifying a new detectable cell.

In some example embodiments, for MCG measurements, UE can be configured to determine whether to apply measurement performance requirements meant for "no DRX" state or for "using DRX" state based on whether the UE is active in either MCG or SCG: If active in either, use "no DRX" requirements, otherwise "using DRX" requirements. If applying "using DRX" requirements, UE could apply requirements (and perform measurements) based on the DRX cycle configured in the MCG. Alternatively UE could apply requirements (and perform measurements) based on whichever of DRX cycles configured in MCG and SCG leads to stricter measurement performance requirement.

Alternatively, an example embodiment could be also for having increased measurements of SCG, when active in MCG.

As an example alternative embodiment, another rule can be introduced such that for example if MCG is in 'DRX active time' or in ShortDRXcycle the SCG is also measured more often.

There can be various ways of implementing certain embodiments. Thus, various embodiments can be implemented in many different ways when it comes to actual signaling Indeed, in certain embodiments the configuration of the user equipment can be done without signaling.

In the following illustrative embodiment, E-UTRAN Rel-12 DC is used as an example. This example should he understood not to be limiting.

A configuration option for the network can be used to configure the UE to measure the MCG/PCell according to both the MCG/PCell DRX and additionally also increase the MCG/PCell measurement activity when the UE is scheduled in SCG/PSCell.

In one example, the MCG/PCell measurements can be increased when the SCG/PSCell active timer (this could be for example DRX inactivity timer configured for SCG) is running. The MCG/PCell measurements can be performed with the same or similar measurements and accuracy as applied for the scheduled SCG/PSCell.

When UE is not scheduled in SCG/PSCell, the UE can perform MCG/PCell measurements according to DRX of the MCG/PCell.

In such an approach, if UE is scheduled on MCG/PCell, this scheduling would not influence the UE measurement performance on the SCG/PSCell. Measurement performance on the MCG/PCell may in this case be performed according to MCG/PCell DRX and SCG/PSCell measurement performance according to the SCG/PSCell DRX.

Figure 1:
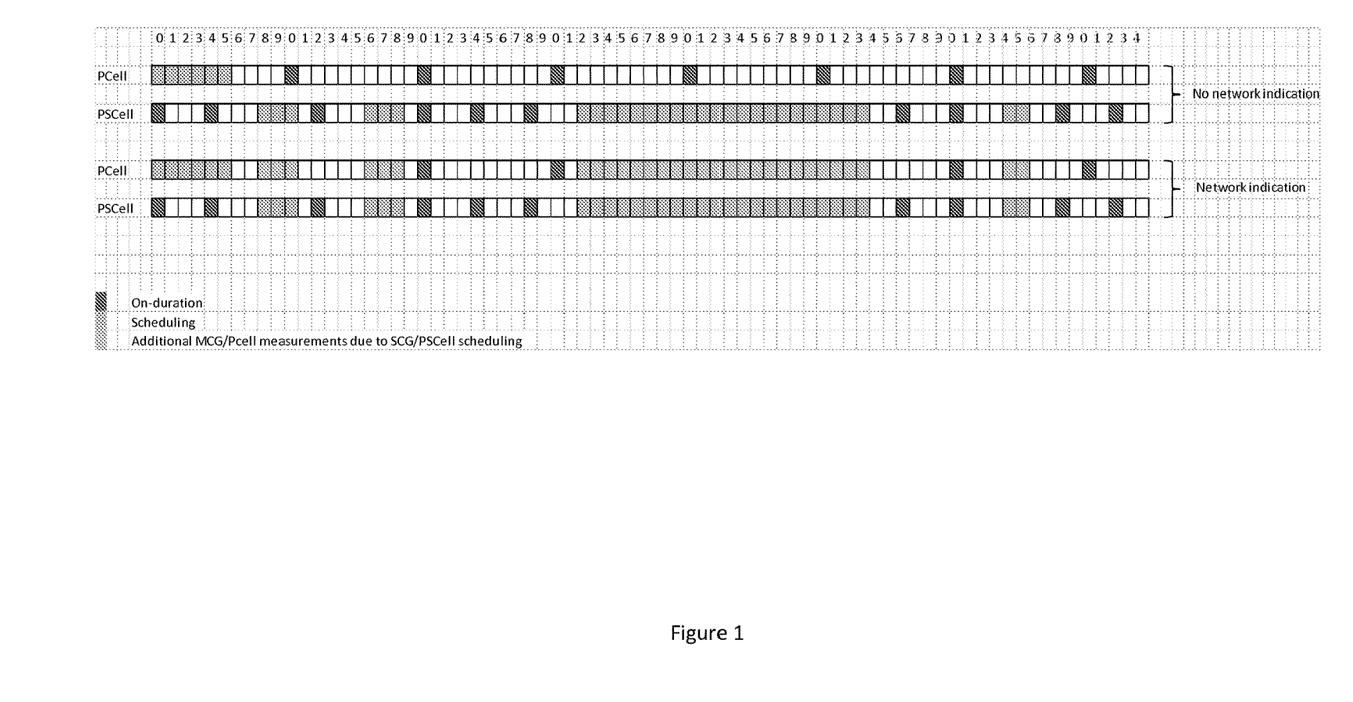
FIG. 1 illustrates subframe usage according to certain embodiments.

FIG. 1 illustrates subframe usage according to certain embodiments. As shown in FIG. 1, the top pair of subframe schedulings illustrates a case in which there is no network indication for increased measurements on PCell based on PSCell activity. By contrast, the bottom pair of subframe schedulings illustrate a case in which there is a network indication for increased measurements on PCell based on PSCell activity. As shown in the legend, the additional PCell measurements are shown with their own shading to distinguish them from the measurements that are already performed without the network indication.

In addition to the features described above, there may be additional features. For example, the increased MCG/PCell measurements could be extended to continue for a limited time after SCG/PSCell scheduling has stopped, such as for one or several additional subframes.

Other variations are also permitted. For example, in a further alternative, the increased MCG/PCell measurements may continue only for a limited number of consecutive subframes and may then be discontinued for following consecutive subframes of SCG/PSCell activity.

In certain scenarios it could be in the interest of network to configure MCG/PCell to have shortened DRX cycle lengths than used on SCG/PSCell. This may done, for example, to ensure good mobility performance. In those scenarios it may also be useful to allow the network to configure whether the activity on MCG/PCell affects the measurement activity on SCG/PSCell layer, which may be the opposite of the approach taken in other embodiments. In such an approach, if UE is scheduled on MCG/PCell, this scheduling may influence the UE measurement performance on the SCG/PSCell.

Like in the feature described above, the behavior could be different depending on the level of activity in the MCG/PCell layers, e.g. if the 'drx-InactivityTimer' is running on MCG/PCell, UE would measure the SCG/PSCell more frequently, and once the timer has expired, UE would follow the configuration given for SCG/PSCell.

Figure 2A:
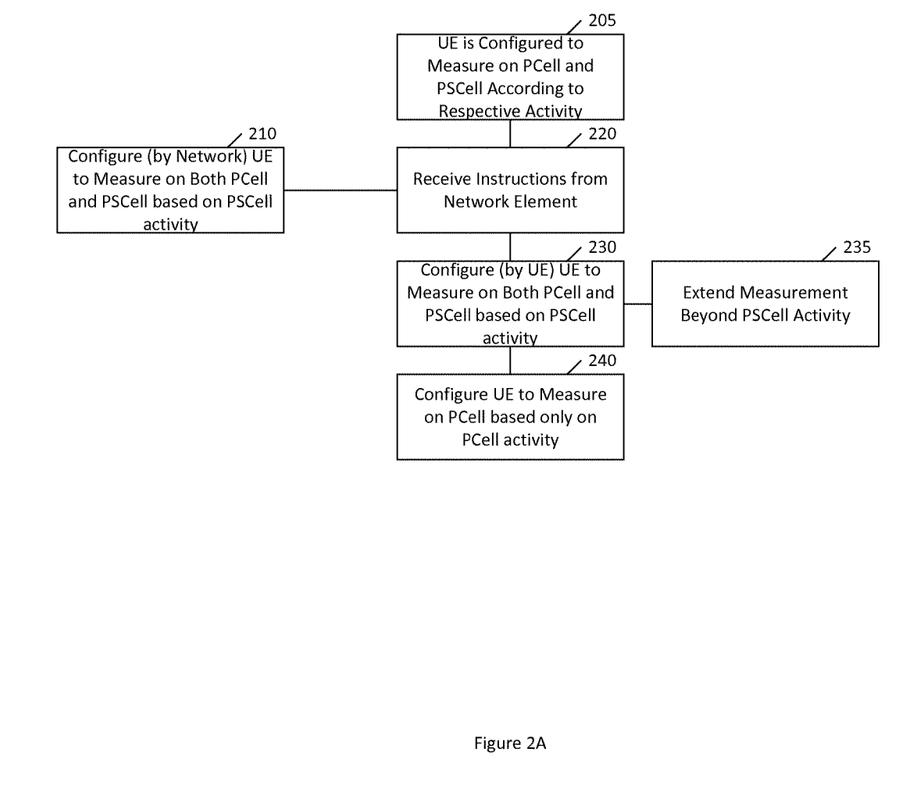
FIG. 2A illustrates a method according to certain embodiments.

FIG. 2 illustrates a method according to certain embodiments. As shown in FIG. 2, a method can include, at 210, configuring, by a network element, a user equipment to perform measurements on both a master cell group and a secondary cell group, according to activity in the secondary cell group.

In some example embodiments, if the UE is active in MCG (or not using DRX, or measuring according to measurement performance requirements for the "not using DRX" case), the increased measurements due to UE activity in SCG may not actually cause the UE to perform more frequent measurements, as it is already measuring frequently. Instead, the increased measurements may impact UE's measurements only when it would be otherwise measuring according to requirements for "using DRX" case.

The configuring can include requiring the user equipment to perform increased measurements on a primary cell according to at least one of the following: normal intra-frequency measurements when a primary secondary cell is in non-discontinuous reception; or an active timer is running in the secondary cell group; or the user equipment has a pending scheduling request in the secondary cell group. Thus, the requirement can indicate that measurements should occur in any, a combination of, or all of those conditions.

The method can also include, at 230, configuring the user equipment, responsive to instructions received at 220 from the network element, to perform the measurements on both the master cell group and the secondary cell group, according to activity in the secondary cell group.

At 240, when the user equipment is not yet or no longer configured with increased master cell group measurement based on secondary cell group activity, the user equipment can be configured to perform master cell group measurements according to a discontinuous reception of the master cell group. In other words, aside from the indication the user equipment may perform measurements only according to a discontinuous reception of the master cell group. Thus, for example, at 205 the UE may have been configured to perform measurements of PCell based on PCell activity and measurements of PSCell based on PSCell activity.

At 235, increased master cell group measurements can be extended to continue for a limited time after secondary cell group scheduling has stopped. In other words, the configuration may not correspond exactly to the periods of activity but can also include some hysteresis in terms of additional measurement that can be undertaken based on previous activity in the secondary cell group.

Figure 2B:
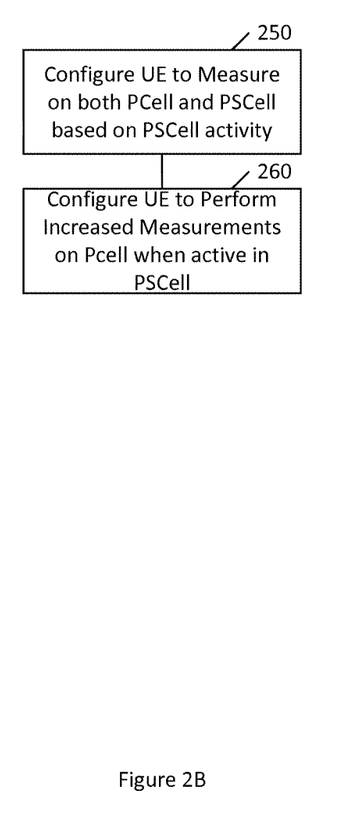
FIG. 2B illustrates another method according to certain embodiments.

FIG. 2B illustrates another method according to certain embodiments. Thus, as shown in FIG. 2B, a method can include, at 250, configuring UE to measure on both PCell and PSCell based on PSCell activity. The method can also include, at 260, configuring UE to perform increased measurements on PCell when active in PSCell.

Thus, in certain embodiments the UE can perform measurements of MCG (or PCell) based on both activity in MCG and activity in SCG. This could be so that if the UE is active (non-DRX) in either CG, the UE can apply the non-DRX measurement performance requirements (more frequent measurements) and otherwise the UE can apply measurements performance requirements with DRX (relaxed compared to requirements when not using DRX). Thus, in certain embodiments measurement performance requirements may be not just based on SCG/PSCell activity, but also on the MSG/PCell activity.

Figure 3:
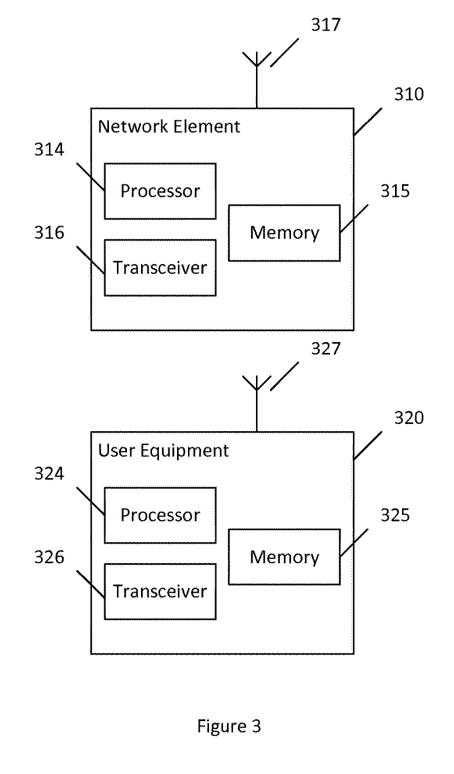
FIG. 3 illustrates a system according to certain embodiments.

FIG. 3 illustrates a system according to certain embodiments of the invention. It should be understood that each block of the flowchart of FIGS. 2A and 2B may be implemented by various means or their combinations, such as hardware, software, firmware, one or more processors and/or circuitry. In one embodiment, a system may include several devices, such as, for example, network element 310 and user equipment (UE) or user device 320. The system may include more than one UE 320 and more than one network element 310, although only one of each is shown for the purposes of illustration. A network element can be an access point, a base station, an eNode B (eNB), or any other network element. Each of these devices may include at least one processor or control unit or module, respectively indicated as 314 and 324. At least one memory may be provided in each device, and indicated as 315 and 325, respectively. The memory may include computer program instructions or computer code contained therein. One or more transceiver 316 and 326 may be provided, and each device may also include an antenna, respectively illustrated as 317 and 327. Although only one antenna each is shown, many antennas and multiple antenna elements may be provided to each of the devices. Other configurations of these devices, for example, may be provided. For example, network element 310 and UE 320 may be additionally configured for wired communication, in addition to wireless communication, and in such a case antennas 317 and 327 may illustrate any form of communication hardware, without being limited to merely an antenna.

Transceivers 316 and 326 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that can run on a server.

A user device or user equipment 320 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 320 may be a sensor or smart meter, or other device that may usually be configured for a single location.

In an exemplifying embodiment, an apparatus, such as a node or user device, may include means for carrying out embodiments described above in relation to FIGS. 2A and 2B.

Processors 314 and 324 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 310 and/or UE 320, to perform any of the processes described above (see, for example, FIGS. 2A and 2B). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 3 illustrates a system including a network element 310 and a UE 320, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, certain embodiments may have better flexibility for the network (NW) to control a UE's measurements. Furthermore, configuration may suit the needs of the situation better and provide lower UE power consumption and/or improved mobility robustness.

In certain possible approaches, the method described herein should not be limited to Dual Connectivity only. Other possible system could be Licensed-Assisted Access (LAA), future 5G systems, or other systems. In such systems with potentially multiple small cell carriers, certain embodiments could be extended for more than one secondary eNB. This could mean, for example, that the UE could be configured to perform increased measurements on MeNB/PCell based on activity on one or more secondary carriers or eNBs. The signaling from eNB to UE could thus indicate one or more cells that are considered, instead of just one SeNB/SCG as in the case of Dual Connectivity.

In order to achieve increased or more frequent measurement of PCell, the UE requirements could be set in such way that they can be affected by the network configuration. For example, the configuration from network such as the RRC signaling could indicate which requirement the UE should apply. Alternatively, the configuration would indicate directly the measurement pattern or periodicity the UE should apply in PCell.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

List of Abbreviations

CG Cell Group
PCell Primary Cell
PSCell Primary Secondary Cell
MCG Master Cell Group
SCG Secondary Cell Group
LTE Long Term Evolution
DC Dual Connectivity
DRX Discontinuous Reception
Rel.12 Release 12
E-UTRAN Evolved Universal Terrestrial Access Network
SeNB Secondary eNB
MeNB Master eNB
eNB evolved Node B (i.e. a base station)

We claim:

1. A method, comprising:
configuring, by an apparatus, a user equipment to perform measurements on both a master cell group and a secondary cell group, according to activity in the secondary cell group associated with at least one discontinuous reception timer configured for the secondary cell group, wherein
the configuring comprises, when the master cell group and the secondary cell group requirements differ from one another, configuring the user equipment to at least one of perform more frequent measurements and reduce an amount of time for performing at least one measurement, and
wherein the measurements comprise at least one of received signal strength indicator, channel state indicator, and channel quality indicator.

2. The method of claim 1, wherein the configuring comprises requiring the user equipment to perform increased measurements on a primary cell, compared to normal intra-frequency measurements, when a primary secondary cell is in non-discontinuous reception or an active timer is running in the secondary cell group or the user equipment has a pending scheduling request in the secondary cell group.

3. The method of claim 1, wherein the configuring comprises optimizing a discontinuous reception operation dynamically based on communication needs of the user equipment.

4. The method of claim 1, wherein the configuring comprises configuring the user equipment to apply a stricter requirement, when master cell group and secondary cell group requirements differ from one another.

5. The method of claim 1, wherein the configuring comprises requiring the user equipment to perform increased measurements on a primary secondary cell, compared to normal intra-frequency measurements, when a primary cell is in non-discontinuous reception or an active timer is running in the primary cell group or the user equipment has a pending scheduling request in the primary cell group.

6. The method of claim 1, wherein the configuring comprises configuring increased master cell group measurements to be extended to continue for a limited time after secondary cell group scheduling has stopped.

7. The method of claim 1, wherein the configuring is performed by the user equipment responsive to instructions from a network element.

8. The method of claim 7, wherein, when the user equipment is not yet or no longer configured with increased master cell group measurement based on secondary cell group activity, the user equipment is configured to perform master cell group measurements according to a discontinuous reception of the master cell group.

9. The method of claim 1, wherein the configuring comprises transmitting instructions from a network element to the user equipment.

10. An apparatus, comprising:
at least one processor; and
at least one memory including computer program code,
wherein the at least one memory and the computer program code are configured to, with the at least one processor, cause the apparatus at least to
configure a user equipment to perform measurements on both a master cell group and a secondary cell group, according to activity in the secondary cell group associated with at least one discontinuous reception timer configured for the secondary cell group, wherein
the configuring comprises, when the master cell group and the secondary cell group requirements differ from one another, configuring the user equipment to at least one of perform more frequent measurements and reduce an amount of time for performing at least one measurement, and
wherein the measurements comprise at least one of received signal strength indicator, channel state indicator, and channel quality indicator.

11. The apparatus of claim 10, wherein the configuration comprises requiring the user equipment to perform increased measurements on a primary cell, compared to normal intra-frequency measurements, when a primary secondary cell is in non-discontinuous reception or an active timer is running in the secondary cell group or the user equipment has a pending scheduling request in the secondary cell group.

12. The apparatus of claim 10, wherein the configuration comprises optimizing a discontinuous reception operation dynamically based on communication needs of the user equipment.

13. The apparatus of claim 10, wherein the configuration comprises configuring the user equipment to apply a stricter requirement, when master cell group and secondary cell group requirements differ from one another.

14. The apparatus of claim 10, wherein the configuration comprises requiring the user equipment to perform increased measurements on a primary secondary cell, compared to normal intra-frequency measurements, when a primary cell is in non-discontinuous reception or an active timer is running in the primary cell group or the user equipment has a pending scheduling request in the primary cell group.

15. The apparatus of claim 10, wherein the configuration comprises configuring increased master cell group measurements to be extended to continue for a limited time after secondary cell group scheduling has stopped.

16. The apparatus of claim 10, wherein the apparatus comprises a user equipment and the configuring is performed by the user equipment responsive to instructions from a network element.

17. The apparatus of claim 16, wherein, when the user equipment is not yet or no longer configured with increased master cell group measurement based on secondary cell group activity, the user equipment is configured to perform master cell group measurements according to a discontinuous reception of the master cell group.

18. The apparatus of claim 10, wherein the apparatus comprises a network element and the configuring comprises transmitting instructions from the network element to the user equipment.

19. A computer program product, embodied on a non-transitory computer readable medium, the computer program product configured to control a processor to perform a process, comprising:

configuring a user equipment to perform measurements on both a master cell group and a secondary cell group, according to activity in the secondary cell group associated with at least one discontinuous reception timer configured for the secondary cell group, wherein the configuring comprises, when the master cell group and the secondary cell group requirements differ from one another, configuring the user equipment to at least one of perform more frequent measurements and reduce an amount of time for performing at least one measurement, and wherein the measurements comprise at least one of received signal strength indicator, channel state indicator, and channel quality indicator.

20. The computer program product of claim 19, wherein the configuring comprises requiring the user equipment to perform increased measurements on a primary cell, compared to normal intra-frequency measurements, when a primary secondary cell is in non-discontinuous reception or an active timer is running in the secondary cell group or the user equipment has a pending scheduling request in the secondary cell group.

* * * * *